United States Patent
Thiel (10) Patent No.: US 12,188,403 B2
(45) Date of Patent: Jan. 7, 2025

(54) INTERNAL COMBUSTION ENGINE AND METHOD FOR SIMULTANEOUSLY REGULATING THE EXHAUST GAS TEMPERATURE AND THE CHARGE PRESSURE OF AN INTERNAL COMBUSTION ENGINE

(71) Applicant: DEUTZ Aktiengesellschaft, Cologne (DE)

(72) Inventor: Michael Thiel, Muenster (DE)

(73) Assignee: Deutz Aktiengesellschaft, Cologne (DE)

( * ) Notice: Subject to any disclaimer, the term of this patent is extended or adjusted under 35 U.S.C. 154(b) by 0 days.

(21) Appl. No.: 18/136,997

(22) Filed: Apr. 20, 2023

(65) Prior Publication Data

US 2023/0349318 A1     Nov. 2, 2023

(30) Foreign Application Priority Data

Apr. 27, 2022    (DE) ...................... 10 2022 001 473.4

(51) Int. Cl.
     *F02B 37/18*      (2006.01)
     *F01N 3/20*      (2006.01)
     (Continued)

(52) U.S. Cl.
CPC ............ *F02B 37/18* (2013.01); *F01N 3/2066* (2013.01); *F02D 9/04* (2013.01); *F02D 41/1406* (2013.01);
(Continued)

(58) Field of Classification Search
CPC .......... F02B 37/183; F02B 37/22; F02D 9/04; F02D 2041/1412; F02D 2041/1433
See application file for complete search history.

(56) References Cited

U.S. PATENT DOCUMENTS 9,988,999 B2    6/2018    Ancimer et al.
2011/0146244 A1*   6/2011    Farman ..................... F02D 9/04
                                                                                                  60/287
(Continued)

FOREIGN PATENT DOCUMENTS

DE      102005004880 B4    5/2015
DE      102015225279 A1    6/2017
(Continued)

OTHER PUBLICATIONS

Rachid Amari, Florent Chabrier, Paolino Tona, Philippe Moulin, A Nonlinear MPC Strategy for Wastegate-Actuated Turbocharged Engines: Early Investigations, IFAC Proceedings vols. vol. 43, Issue 7, 2010, pp. 590-597, ISSN 1474-6670, ISBN 9783902661722, https://doi.org/10.3182/20100712-3-DE-2013.00153.*
(Continued)

*Primary Examiner* — Ngoc T Nguyen
(74) *Attorney, Agent, or Firm* — Davidson Kappel LLC (57) ABSTRACT

An internal combustion engine and method for simultaneously regulating the exhaust gas temperature and the charge pressure of an internal combustion engine. An internal combustion engine that includes: an exhaust gas turbocharger (17) including a turbine (19) that is situated in an exhaust duct (8), and including a compressor (18) that is situated in an intake duct (4); a bypass valve (13) via which at least a portion of an exhaust gas mass flow of the internal combustion engine may be led past the turbine (19); and an exhaust gas flap (15) that is situated in the exhaust duct (8), downstream from the turbine (19) and the bypass valve (13).

5 Claims, 4 Drawing Sheets

(51) Int. Cl.
   *F02D 9/04*         (2006.01)
   *F02D 41/14*        (2006.01)
(52) U.S. Cl.
   CPC .. *F01N 2240/36* (2013.01); *F01N 2900/1622* (2013.01); *F02D 2041/1412* (2013.01); *F02D 2041/1433* (2013.01); *F02D 2200/0408* (2013.01); *F02D 2200/0812* (2013.01)

(56) References Cited

U.S. PATENT DOCUMENTS

| | | | |
|---|---|---|---|
| 2016/0010528 A1* | 1/2016 | Light-Holets | F02B 29/0418 60/599 |
| 2018/0003118 A1 | 1/2018 | Zur Loye et al. | |
| 2018/0216558 A1 | 8/2018 | Buchholz et al. | |
| 2018/0347499 A1 | 12/2018 | Wang et al. | |
| 2019/0085780 A1 | 3/2019 | Liao-Mcpherson et al. | |

FOREIGN PATENT DOCUMENTS

| | | | |
|---|---|---|---|
| DE | 102016014767 A1 | * | 6/2018 |
| DE | 102018113160 A1 | | 12/2018 |
| DE | 102018220383 A1 | | 5/2020 |
| EP | 2161436 A1 | | 3/2010 |
| JP | 2011099372 A | | 5/2011 |

OTHER PUBLICATIONS

Michael Thiel: "MPC for diesel engine control, The exhaust gas temperature as an additional control variable," DEUTZ, presentation given at Egersburg Workshop, Feb. 19, 2020, see partial English translation.

* cited by examiner

INTERNAL COMBUSTION ENGINE AND METHOD FOR SIMULTANEOUSLY REGULATING THE EXHAUST GAS TEMPERATURE AND THE CHARGE PRESSURE OF AN INTERNAL COMBUSTION ENGINE

This claims the benefit of German Patent Application DE 10 2022 001 473.4, filed on Apr. 27, 2022 which is hereby incorporated by reference herein.

The present disclosure relates to an internal combustion engine and a method for simultaneously regulating the exhaust gas temperature and the charge pressure of an internal combustion engine.

BACKGROUND

Internal combustion engines, in particular diesel engines, emit exhaust gases, in particular nitrogen oxides and soot particles, that are harmful to health. In recent years, the limits for maximum allowable emissions have become more stringent worldwide. Internal combustion engines therefore routinely include exhaust aftertreatment systems to reduce the emissions of the internal combustion engine. The exhaust aftertreatment systems may in particular include a particulate filter for removing soot particles, and a selective catalytic reduction (SCR) catalytic converter for eliminating nitrogen oxides.

Particulate filters as well as SCR catalytic converters require a certain operating temperature in order to function. The temperature of the stated components is determined primarily via the temperature of the exhaust gas supplied by the engine.

A method for exhaust gas temperature regulation for an internal combustion engine is known from DE 10 2005 004 880 B4, in which when a predefined maximum exhaust gas temperature in the mixture is exceeded, the air-fuel ratio is decreased, continuously or in multiple steps, down to a lower limiting value, and when this limiting value is reached, the cylinder charge is reduced, continuously or in multiple steps.

SUMMARY

On this basis, an underlying object of the present disclosure is to provide an internal combustion engine that enables a rapid regulation of the exhaust gas temperature, while simultaneously minimizing efficiency losses of the internal combustion engine. A further underlying object of the present disclosure is to provide a method for simultaneously regulating the exhaust gas temperature and the charge pressure of an internal combustion engine, which enables a rapid regulation with a high efficiency of the internal combustion engine.

To achieve this object, an internal combustion engine is provided which includes: an exhaust gas turbocharger including a turbine that is situated in an exhaust duct, and including a compressor that is situated in an intake duct; a bypass valve via which at least a portion of the exhaust gas of the internal combustion engine may be led past the turbine; and an exhaust gas flap that is situated in the exhaust duct, downstream from the turbine and the bypass valve.

The internal combustion engine includes two actuators in the exhaust duct which may be used for regulating the exhaust gas temperature. The first actuator is the exhaust gas flap. Closing the exhaust gas flap generates a flow resistance of the exhaust gas flowing through the exhaust duct, thus increasing the exhaust gas back pressure. As a result, the power of the compressor of the exhaust gas turbocharger decreases, resulting in a reduction of the exhaust gas volumetric flow. This in turn results in a reduced charge pressure that is provided in the intake duct. Less fresh air flows through the internal combustion engine as a result of the reduced charge pressure. The energy of the fuel combusted in the combustion chambers of the internal combustion engine is therefore distributed over less gas, so that the exhaust gas reaches a higher temperature. In addition, when the exhaust gas flap is closed, the exhaust gas back pressure increases in the exhaust duct directly downstream from the combustion chambers of the internal combustion engine. Closing the exhaust gas flap thus results in a decreasing charge pressure in combination with an increasing exhaust gas back pressure, so that charge cycle losses of the internal combustion engine increase and the efficiency of the internal combustion engine drops. Regulation of the exhaust gas temperature may thus be achieved via the exhaust gas flap alone; the closing of the exhaust gas flap is accompanied by significant efficiency losses.

The second actuator is the bypass valve, via which the charge pressure provided by the compressor into the intake duct is primarily regulatable. The portion of the exhaust gas that flows past the turbine of the exhaust gas turbocharger may be increased by opening the bypass valve, so that the compressor power is reduced, resulting in a reduced charge pressure which in turn results in an increase in the exhaust gas temperature, as described above. Closing the bypass valve has the opposite effect.

The internal combustion engine according to the present disclosure has the advantage that a setpoint exhaust gas temperature may be regulated primarily via the bypass valve, up to a variable limiting value of the exhaust gas temperature, without having to accept significant efficiency losses of the internal combustion engine. Only afterwards, when the setpoint exhaust gas temperature is above the variable limiting value of the exhaust gas temperature that is settable by the bypass valve, is it possible for the exhaust gas flap to additionally be used for regulating the exhaust gas temperature, with acceptance of efficiency losses of the internal combustion engine.

In one possible specific embodiment, the internal combustion engine may be designed as a diesel internal combustion engine.

In one possible specific embodiment of the internal combustion engine, the exhaust duct may include an exhaust aftertreatment system. The exhaust aftertreatment system may in particular encompass all known exhaust emission control systems. The exhaust emission control systems may in particular be based on chemical processes. For example, the exhaust aftertreatment system may include a particulate filter and/or and [sic] a catalytic converter based on selective catalytic reduction of the exhaust gas (SCR catalytic converter).

In a further possible specific embodiment of the internal combustion engine, the intake duct and the exhaust duct may be fluidically connected to one another solely via the combustion chambers of the internal combustion engine. In this case, the internal combustion engine has no exhaust gas recirculation, for example.

Moreover, for achieving the object, a method for simultaneously regulating the exhaust gas temperature and the charge pressure of an internal combustion engine, in particular an internal combustion engine of the type described above, is provided, including the following steps: ascertaining an actual charge pressure; ascertaining an actual exhaust gas temperature; determining a setpoint charge pressure; determining a setpoint exhaust gas temperature range; simultaneously determining a manipulated variable of a bypass valve, via which at least a portion of the exhaust gas mass flow of the internal combustion engine may be led past a turbine of an exhaust gas turbocharger, and a manipulated variable of an exhaust gas flap with the aid of a nonlinear model-predictive controller as a function of the actual charge pressure, the actual exhaust gas temperature, the setpoint charge pressure, and the setpoint exhaust gas temperature range; and setting the manipulated variable of the bypass valve and the manipulated variable of the exhaust gas flap.

In addition to the exhaust gas temperature, which is essentially regulated for the functional capability of the exhaust aftertreatment system, the charge pressure is a further controlled variable that is regulated essentially for optimizing the efficiency of the internal combustion engine.

As described above, the bypass valve and the exhaust gas flap simultaneously influence the controlled variables of exhaust gas temperature and charge pressure. Therefore, this is a coupled multivariable system. Accordingly, it is not possible to regulate one of the controlled variables without at the same time likewise changing the other of the two controlled variables, so that for the most part there is a conflict of objectives between the two controlled variables.

The method according to the present disclosure has the advantage that this conflict of objectives may be resolved by determining a setpoint exhaust gas temperature range and not a specific setpoint exhaust gas temperature, and by appropriate regulation as a function of the setpoint exhaust gas temperature range. Simultaneously regulating the exhaust gas temperature and the charge pressure is thus made possible.

In one possible specific embodiment of the method, the nonlinear model-predictive controller may predict a charge pressure at one or multiple subsequent points in time as a function of the manipulated variable of the bypass valve and of the manipulated variable of the exhaust gas flap.

The nonlinear model-predictive controller may predict an exhaust gas temperature at the one or multiple subsequent points in time as a function of the manipulated variable of the bypass valve and of the manipulated variable of the exhaust gas flap.

The nonlinear model-predictive controller may minimize a quality function, the quality function representing a function based on the difference between the setpoint charge pressure and the predicted charge pressure at the one or multiple subsequent points in time, and/or based on the difference between the setpoint exhaust gas temperature range and the predicted exhaust gas temperature at the one or multiple subsequent points in time. If the predicted exhaust gas temperature drops into the setpoint exhaust gas temperature range, the difference between the setpoint exhaust gas temperature range and the predicted exhaust gas temperature is equal to zero. The quality function may also be referred to as a cost function or a quality functional.

In a further embodiment of the method, the nonlinear model-predictive controller may predict a charge pressure for a prediction horizon as a function of the manipulated variable of the bypass valve and of the manipulated variable of the exhaust gas flap. The nonlinear model-predictive controller may predict an exhaust gas temperature for a prediction horizon as a function of the manipulated variable of the bypass valve and of the manipulated variable of the exhaust gas flap. If the predicted exhaust gas temperature drops into the setpoint exhaust gas temperature range, the difference between the setpoint exhaust gas temperature range and the predicted exhaust gas temperature is equal to zero. The prediction horizon temporally extends from a starting point in time tS to an ending point in time tS+T. The prediction horizon has a duration T. Actual point in time to may be selected as starting point in time tS. The prediction horizon may include the above-mentioned one or multiple subsequent points in time.

In the above-mentioned case, the nonlinear model-predictive controller may minimize a quality function that represents a function based on the difference between the setpoint charge pressure and the predicted charge pressure in the prediction horizon, and/or based on the difference between the setpoint exhaust gas temperature range and the predicted exhaust gas temperature in the prediction horizon. The quality function may represent a function based on an integral of the difference between the setpoint charge pressure and the predicted charge pressure over the prediction horizon, and/or based on an integral of the difference between the setpoint exhaust gas temperature range and the predicted exhaust gas temperature over the prediction horizon.

In one possible specific embodiment, the nonlinear model-predictive controller may minimize the quality function, taking at least one constraint into account. In particular, the at least one constraint may be a function of one of the following: the maximum rotational speed of an exhaust gas turbocharger of the internal combustion engine, the maximum exhaust gas back pressure of the internal combustion engine, the maximum exhaust gas temperature in the exhaust duct of the internal combustion engine, the maximum exhaust gas temperature at the turbine of the exhaust gas turbocharger of the internal combustion engine, the minimum fuel-air ratio in the combustion chamber of the internal combustion engine, and the maximum manipulated variable of the exhaust gas flap.

The manipulated variable of the exhaust gas flap may assume a value between a maximum operating manipulated variable for which the exhaust gas flap is maximally closed, and a minimum operating manipulated variable for which the exhaust gas flap is maximally open, or may be set to this value.

The maximum manipulated variable of the exhaust gas flap may be determined as a function of the predicted exhaust gas temperature. When the predicted exhaust gas temperature is below the setpoint exhaust gas temperature range, the maximum manipulated variable of the exhaust gas flap may be set to the maximum operating manipulated variable for which the exhaust gas flap is maximally closed.

Alternatively or in combination, when the predicted exhaust gas temperature is in the setpoint exhaust gas temperature range or thereabove, the maximum manipulated variable of the exhaust gas flap may be set to a minimum operating manipulated variable for which the exhaust gas flap is maximally open. Alternatively, when the predicted exhaust gas temperature is in the setpoint exhaust gas temperature range or thereabove, the maximum manipulated variable of the exhaust gas flap may be set to a value between the maximum operating manipulated variable and the minimum operating manipulated variable, the value continuously decreasing in the direction of the minimum operating manipulated variable with an increasing difference between the predicted exhaust gas temperature and a setpoint minimum exhaust gas temperature of the exhaust gas temperature range.

The manipulated variable of the bypass valve may assume a value between a minimum operating manipulated variable for which the bypass valve is maximally closed, and a maximum operating manipulated variable for which the bypass valve is maximally open, or may be set to this value.

In one possible specific embodiment, for determining the setpoint exhaust gas temperature range a setpoint minimum exhaust gas temperature of the exhaust gas temperature range may be determined. The setpoint exhaust gas temperature range is limited by the setpoint minimum exhaust gas temperature for low exhaust gas temperature values. The exhaust gas temperature range may thus be referred to as an interval that is open at high exhaust gas temperature values.

For determining the setpoint minimum exhaust gas temperature of the exhaust gas temperature range, a minimum temperature of a particulate filter of the internal combustion engine may be determined. In particular, the minimum temperature of the particulate filter may be determined as a function of an actual temperature of the particulate filter. The actual temperature of the particulate filter may be determined with the aid of a temperature sensor. Alternatively or in combination, the minimum temperature of the particulate filter may be determined as a function of the actual soot loading of the particulate filter. The actual soot loading of the particulate filter may be measured or determined in a manner known to those skilled in the art.

For determining the setpoint minimum exhaust gas temperature of the exhaust gas temperature range, a minimum temperature of an SCR catalytic converter of the internal combustion engine may be determined. The minimum temperature of the SCR catalytic converter of the internal combustion engine may be determined in particular as a function of the ammonia loading of the SCR catalytic converter. The ammonia loading of the SCR catalytic converter may be measured or determined in a manner known to those skilled in the art.

For determining the setpoint minimum exhaust gas temperature of the exhaust gas temperature range, a maximum temperature of the SCR catalytic converter of the internal combustion engine may be determined. The maximum temperature of the SCR catalytic converter of the internal combustion engine may be determined in particular as a function of an actual temperature of the SCR catalytic converter and/or of a maximum temporal temperature gradient of the SCR catalytic converter. Ammonia slip may be avoided by limiting the temperature gradient of the SCR catalytic converter to a maximum value. The temperature of the SCR catalytic converter may be determined with the aid of a temperature sensor.

For determining the setpoint minimum exhaust gas temperature of the exhaust gas temperature range, a minimum temperature of an SCR metering system of the internal combustion engine may be determined. The minimum temperature of an SCR metering system of the internal combustion engine may be determined in particular as a function of a required reducing agent mass flow of the SCR metering system. The required reducing agent mass flow of the SCR metering system may also be referred to as the setpoint reducing agent mass flow.

For determining the setpoint minimum exhaust gas temperature of the exhaust gas temperature range, a comparative value may be determined from the maximum value of the minimum temperature of the particulate filter of the internal combustion engine, the minimum temperature of the SCR catalytic converter of the internal combustion engine, and the minimum temperature of the SCR metering system of the internal combustion engine. Optionally, the setpoint minimum exhaust gas temperature of the exhaust gas temperature range may be set to the minimum value of the comparative value and the maximum temperature of the SCR catalytic converter of the internal combustion engine.

BRIEF SUMMARY OF THE DRAWINGS

One embodiment of an internal combustion engine according to the present disclosure and one embodiment of a method according to the present disclosure for simultaneously regulating the exhaust gas temperature and the charge pressure of an internal combustion engine are explained below with reference to the drawings.

DETAILED DESCRIPTION

Figure 1:
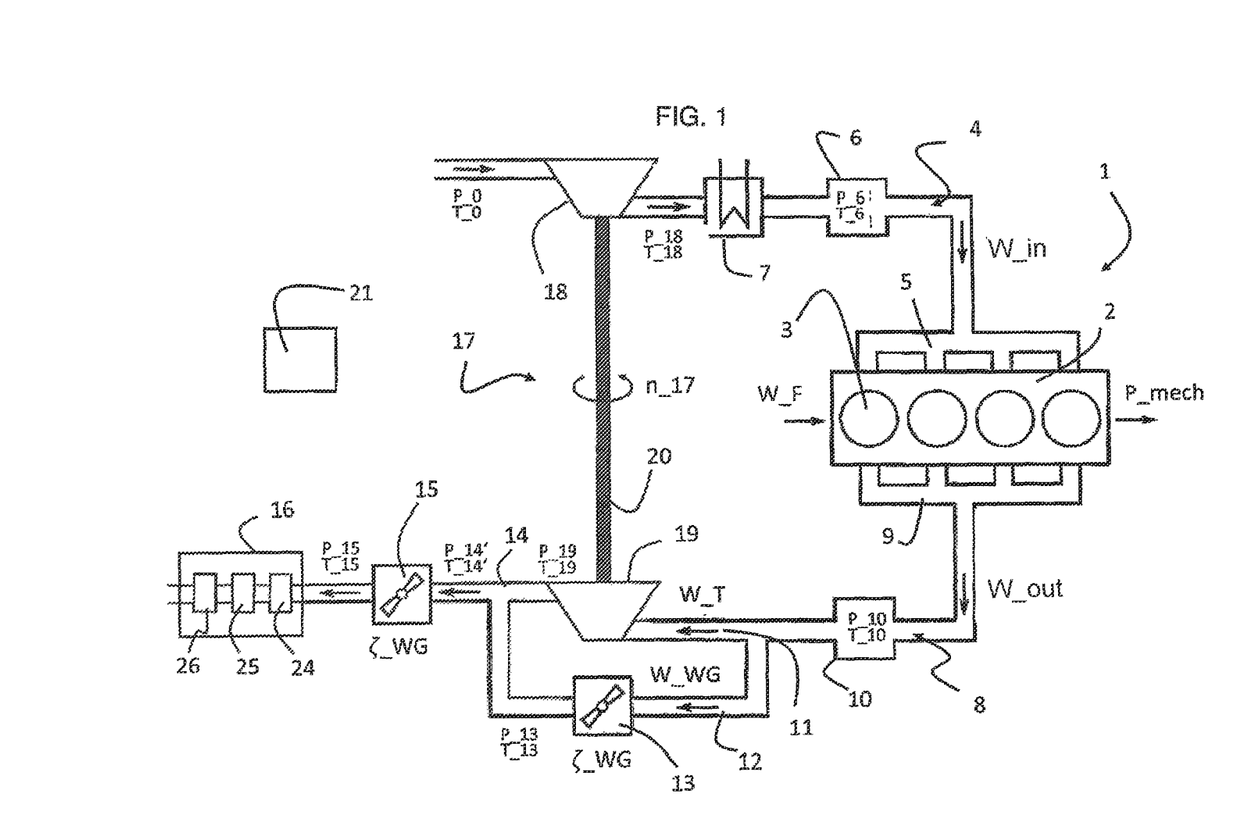
FIG. 1 shows a schematic illustration of an internal combustion engine according to the present disclosure.

FIG. 1 shows an internal combustion engine 1 according to the present disclosure, in which a fuel mass flow W_F is converted into mechanical power P_mech. For this purpose, a crankcase 2 of internal combustion engine 1 includes multiple combustion chambers 3 in which the fuel is combusted in a known manner. In the present case, internal combustion engine 1 includes four combustion chambers 3.

Internal combustion engine 1 includes an intake duct 4 via which individual combustion chambers 3 are supplied with fresh air for the combustion of the fuel. In the area of an intake manifold 5, intake duct 4 branches from a central duct into four individual streams, each of which is connected to a combustion chamber 3.

A compressor 18 of an exhaust gas turbocharger 17 is situated in intake duct 4. Charge air from the surroundings, at atmospheric pressure P_0 and ambient temperature T_0, is drawn in and compressed via compressor 18. Atmospheric pressure P_0 is measured via an atmospheric pressure sensor, and ambient temperature T_0 is measured via an ambient temperature sensor. Directly downstream from compressor 18, the pressure of the charge air assumes value P_18, and the temperature of the charge air assumes value T_18.

Also situated in intake duct 4, downstream from compressor 18, is a charge air cooler 7, with the aid of which the charge air may be cooled in a known manner.

In the area directly upstream from intake manifold 5, intake duct 4 includes a measuring point 6 at which charge pressure P_6 is ascertained with the aid of a charge pressure sensor, and charge air temperature T_6 is ascertained with the aid of a charge air temperature sensor. Intake manifold 5 is supplied with a fresh air mass flow W_in.

Combustion chamber [sic] 1 also includes an exhaust duct 8 via which exhaust gas mass flow W_out, which results from the combustion of fuel in combustion chamber 3, may be discharged. Provided in exhaust duct 8 is an exhaust manifold 9 in which individual streams, each connected to a combustion chamber 3, are combined into a central duct.

In the area directly downstream from exhaust manifold 9, exhaust duct 8 includes a measuring point 10 in the central duct, at which exhaust gas pressure P_10 is ascertained with the aid of a first exhaust gas pressure sensor, and exhaust gas temperature T_10 is ascertained with the aid of a first exhaust gas temperature sensor. Exhaust gas pressure P_10 may also be referred to as the exhaust gas back pressure. Alternatively, exhaust gas temperature T_10 may be ascertained indirectly with the aid of a state observer, using further measured values.

Downstream from measuring point 10, exhaust duct 8 branches into a turbine duct 11 and a bypass duct 12. Exhaust gas mass flow W_out is accordingly divided between turbine duct 11 and bypass duct 12, an exhaust gas mass flow W_T flowing through turbine duct 11, and an exhaust gas mass flow W_WG flowing through bypass duct 12.

A turbine 19 of exhaust gas turbocharger 17 is situated in turbine duct 11. Turbine 19 is connected to compressor 18 via a shaft 20. Turbine 19 withdraws energy from exhaust gas mass flow W_out in a known manner in order to drive compressor 18 via shaft 20. Rotational speed n_17 of shaft 20 may be simulated via a state observer, or measured with the aid of a rotational speed sensor.

Directly downstream from turbine 19, the pressure of exhaust gas mass flow W_T flowing through turbine duct 11 assumes value P_19, and the temperature of exhaust gas mass flow W_T flowing through turbine duct 11 assumes value T_19.

A bypass valve 13 is situated in bypass duct 12. Bypass valve 13 may also be referred to as a wastegate. Bypass valve 13 may be infinitely adjusted between a closed position in which bypass valve 13 is maximally closed, and which may also be referred to as a minimum operating manipulated variable, and an open position in which bypass valve 13 is maximally open, and which may also be referred to as a maximum operating manipulated variable. The particular manipulated variable of bypass valve 13 is referred to as bypass valve positionξ_WG. Exhaust gas mass flow W_WG flowing through bypass duct 12 may be adjusted by opening or closing bypass valve 13. In other words, the portion of exhaust gas mass flow W_out flowing through bypass duct 12 may be adjusted by opening or closing bypass valve 13. Bypass valve position WG is measured by a bypass valve position sensor, for example a rotation angle sensor.

Directly downstream from bypass valve 13, the pressure of exhaust gas mass flow W_WG flowing through bypass duct 12 assumes value P_13, and the temperature of exhaust gas mass flow W_WG flowing through bypass duct 12 assumes value T_13.

Downstream from turbine 19 and downstream from bypass valve 13, turbine duct 11 and bypass duct 12 are combined into a collection point 14. An exhaust gas flap 15 is situated in exhaust duct 8, downstream from collection point 14. Exhaust gas flap 15 may be infinitely adjusted between a closed position in which exhaust gas flap 15 is maximally closed, and which may also be referred to as a maximum operating manipulated variable, and an open position in which exhaust gas flap 15 is maximally open, and which may also be referred to as a minimum operating manipulated variable. The particular manipulated variable of exhaust gas flap 15 is referred to as exhaust gas flap positionξ_AK. Exhaust gas flap positionξ_AK is measured by an exhaust gas flap position sensor, for example a rotation angle sensor.

In the area directly in front of (upstream from) exhaust gas flap 15, the exhaust gas mass flow has a pressure having value P_15', which is ascertained by a second exhaust gas pressure sensor or simulated by a state observer, and a temperature having value T_15', which is ascertained by a second exhaust gas temperature sensor.

In the area directly behind (downstream from) exhaust gas flap 15, the exhaust gas mass flow has a pressure having value P_15, which is ascertained by a third exhaust gas pressure sensor or simulated by a state observer, and a temperature having value T_15, which is ascertained by a third exhaust gas temperature sensor.

The second exhaust gas pressure sensor and the third exhaust gas pressure sensor may be used in combination, or as alternatives. The second exhaust gas temperature sensor and the third exhaust gas temperature sensor may be used in combination, or as alternatives.

In the present case, an exhaust aftertreatment system 16 is situated downstream from exhaust gas flap 15. Exhaust aftertreatment system 16 includes a particulate filter 24 that removes particles, in particular soot particles, from the exhaust gas mass flow in a known manner. Temperature T_24 of particulate filter 24 is measured by a particulate filter temperature sensor or simulated by a suitable temperature model.

Exhaust aftertreatment system 16 also includes an SCR catalytic converter 26 that removes nitrogen oxides from the exhaust gas mass flow in a known manner via selective catalytic reduction. Temperature T_26 of SCR catalytic converter 26 is measured by a catalytic converter temperature sensor or simulated by a suitable temperature model.

Situated between particulate filter 24 and SCR catalytic converter 26 is an SCR metering system 25, with the aid of which ammonia, for example in the form of urea, may be metered into exhaust duct 8 or into SCR catalytic converter 26. Temperature T_25 of SCR metering system 25 is measured by a metering system temperature sensor or simulated by a suitable temperature model.

Internal combustion engine 1 includes a control unit 21, which may also be referred to as a computer, with the aid of which internal combustion engine 1 is controllable. Control unit 21 is designed to detect a state vector x̂ of internal combustion engine 1. State vector x̂ may encompass, for example, one or multiple values of the power requirement of the internal combustion engine, the fuel mass flow, crankshaft rotational speed n_mot, exhaust gas turbocharger rotational speed n_17, bypass valve positionξ_WG, exhaust gas flap position ξ_AK, fuel-air ratio 2, ambient pressure P_0, ambient temperature T_0, pressure of charge air P_18, charge pressure P_6, exhaust gas pressure P_10, temperature of charge air T_18, charge air temperature T_6, exhaust gas temperature T_10, temperature T_19 of the exhaust gas mass flow flowing through turbine duct 11, temperature T_13 of the exhaust gas mass flow flowing through bypass duct 12, particulate filter temperature T_24, the temporal profile of the soot mass flow in particulate filter 24, the particle loading of particulate filter 24, and the nitrogen oxides loading of SCR catalytic converter 26.

Control unit 21 may be designed in such a way that one or multiple values of state vector x̂ may be simulated as a function of further values of state vector x̂, based on state observers. In addition, control unit 21 is switched off [sic] to simultaneously regulate exhaust gas temperature T_15 and charge pressure P_6. Control unit 21 is also switched off [sic] to set bypass valve positionξ_WG and exhaust gas flap positionξ_AK.

Figure 2:
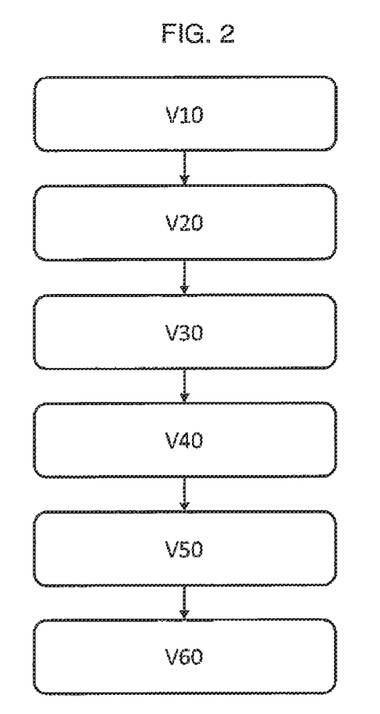
FIG. 2 shows an illustration of a method according to the present disclosure for simultaneously regulating the exhaust gas temperature and the charge pressure of the internal combustion engine according to FIG. 1.

FIG. 2 illustrates one embodiment of a method according to the present disclosure for simultaneously regulating the exhaust gas temperature and the charge pressure of an internal combustion engine, with reference to a flowchart. In the present case, the method is explained for the internal combustion engine described above.

Actual charge pressure P_6_actual is ascertained at actual point in time in a method step V10. Actual charge pressure P_6_actual is measured by the charge pressure sensor. Alternatively, actual charge pressure P_6_actual may be ascertained as a function of actual exhaust gas turbocharger rotational speed n_17_actual, using a state observer.

The actual exhaust gas temperature at actual point in time t0 is ascertained in a further method step V20. In the present case, the actual exhaust gas temperature is ascertained downstream from exhaust gas flap 15 and upstream from exhaust aftertreatment system 16 by a third exhaust gas temperature sensor. In this case, the actual exhaust gas temperature thus corresponds to value T_15_actual. Alternatively, the actual exhaust gas temperature may be ascertained directly upstream from exhaust gas flap 15 by the second exhaust gas temperature sensor. In this case, the actual exhaust gas temperature thus corresponds to value T_15'_actual.

A setpoint charge pressure P_6_setpoint at a point in time t0+T subsequent to actual point in time t0 is determined in a further method step V30. Actual point in time t0 and subsequent point in time t0+T delimit a prediction horizon having duration T. Setpoint charge pressure P_6_setpoint is determined for the entire prediction horizon. This may take place as a function of crankshaft rotational speed n_mot and/or of fuel mass flow W_F.

A setpoint range of exhaust gas temperature T_15 (or of exhaust gas temperature T_15') for the prediction horizon, which may also be referred to as the setpoint exhaust gas temperature range, is determined in a further method step V40. For this purpose, a setpoint minimum exhaust gas temperature T_15_min of exhaust gas temperature range is determined.

For determining setpoint minimum exhaust gas temperature T_15_min of the setpoint exhaust gas temperature range, a minimum temperature T_24_min of particulate filter 24 is determined as a function of the actual soot loading of particulate filter 24 at actual point in time t0 and/or of actual temperature T_24_actual of particulate filter 24 at actual point in time t0.

For determining setpoint minimum exhaust gas temperature T_15_min of the setpoint exhaust gas temperature range, in addition a minimum temperature T_26_min of SCR catalytic converter 26 is determined as a function of the actual ammonia loading of SCR catalytic converter 26 at actual point in time t0.

For determining setpoint minimum exhaust gas temperature T_15_min of the setpoint exhaust gas temperature range, in addition a maximum temperature T_26_max of SCR catalytic converter 26 is determined as a function of actual temperature T_26_actual at actual point in time t0 and of a maximum allowable temperature gradient dT26_max of SCR catalytic converter 26. Temperature gradient dT26_max describes the change over time of a mean temperature T_26_mean of SCR catalytic converter 26.

For determining setpoint minimum exhaust gas temperature T_15_min of the setpoint exhaust gas temperature range, in addition a minimum temperature T_25_min of SCR metering system 25 is determined. This takes place as a function of a setpoint reducing agent mass flow of SCR metering system 25 for the prediction horizon.

For determining setpoint minimum exhaust gas temperature T_15_min of the setpoint exhaust gas temperature range, a comparative value is determined from the maximum value of minimum temperature T_24_min of particulate filter 24, minimum temperature T_26_min of SCR catalytic converter 26, and minimum temperature T_25_min of SCR metering system 25.

Optionally, setpoint minimum exhaust gas temperature T_15_min of the exhaust gas temperature range may be set to the minimum value of the comparative value and maximum temperature T_26_max of SCR catalytic converter 26.

Manipulated variable $\xi$_WG of bypass valve 13 and manipulated variable $\xi$_AK of the exhaust gas flap are simultaneously determined in a further method step V50. This takes place with the aid of a nonlinear model-predictive controller as a function of actual charge pressure P_6_actual, of actual exhaust gas temperature T_15_actual, of setpoint charge pressure P_6_setpoint, and of the setpoint exhaust gas temperature range.

The nonlinear model-predictive controller simulates charge pressure P_6_pred at one or multiple subsequent points in time in the prediction horizon as a function of manipulated variable $\xi$_WG of the bypass valve and of manipulated variable $\xi$_AK of the exhaust gas flap. The nonlinear model-predictive controller simulates exhaust gas temperature T_15_pred at one or multiple subsequent points in time in the prediction horizon as a function of manipulated variable $\xi$_WG of bypass valve 13 and of manipulated variable $\xi$_AK of exhaust gas flap 15.

The nonlinear model-predictive controller minimizes a quality function, the quality function being a function based on the difference between setpoint charge pressure P_6_setpoint and predicted charge pressure P_6_pred at the one or multiple subsequent points in time. The quality function is also a function based on the difference between the setpoint exhaust gas temperature range and predicted exhaust gas temperature T_15_pred at the one or multiple subsequent points in time. The difference between the setpoint exhaust gas temperature range and predicted exhaust gas temperature T_15_pred is set to zero when predicted exhaust gas temperature T_15_pred is in the setpoint exhaust gas temperature range.

The nonlinear model-predictive controller minimizes the quality function, taking the following constraints into account.

Rotational speed n_17 of exhaust gas turbocharger 17 must not exceed maximum rotational speed n_17_max of exhaust gas turbocharger 17.

Exhaust gas pressure P_10 must not exceed maximum exhaust gas back pressure P_10_max.

Exhaust gas temperature T_10 at measuring point 10 must not exceed maximum exhaust gas temperature T10_max in exhaust duct 8.

Exhaust gas temperature T_19 directly downstream from turbine 19 of exhaust gas turbocharger 17 must not exceed a maximum exhaust gas temperature T_19_max at turbine 19 of exhaust gas turbocharger 17.

Fuel-air ratio $\lambda$ in combustion chamber 3 must not fall below minimum fuel-air ratio $\lambda$_min.

Manipulated variable $\xi$_AK of exhaust gas flap 15 must not exceed a maximum manipulated variable $\xi$_AK_max. Maximum manipulated variable $\xi$_AK_max of exhaust gas flap 15 is determined as a function of predicted exhaust gas temperature T_15_pred. Maximum manipulated variable $\xi$_AK_max of exhaust gas flap 15 is set to a maximum operating manipulated variable $\xi$_AK_1 for which exhaust gas flap 15 is maximally closed, when predicted exhaust gas temperature T_15_pred is below the setpoint exhaust gas temperature range.

Figure 3:
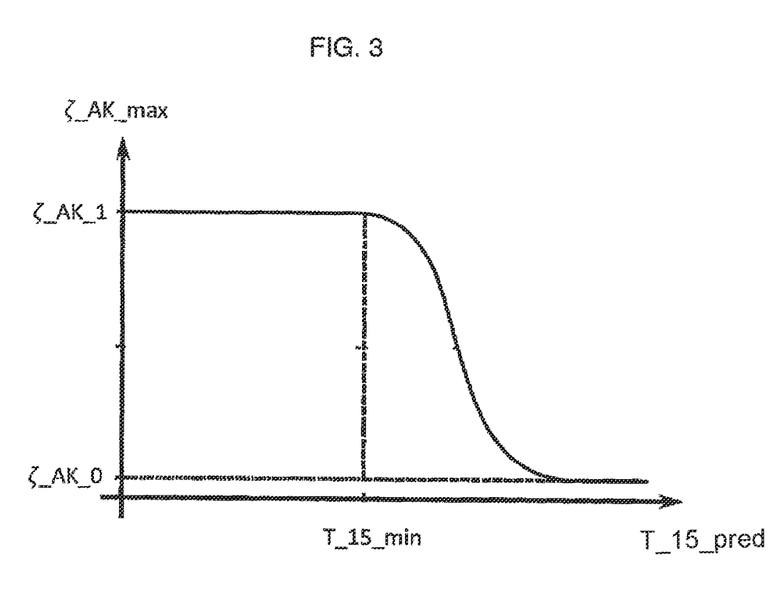
FIG. 3 shows a graphical illustration of the determination of maximum manipulated variable $\xi\_AK\_max$ of the exhaust gas flap.

In addition, maximum manipulated variable $\xi$_AK_max of exhaust gas flap 15 is set to a minimum operating manipulated variable ξ_AK_0 for which the exhaust gas flap is maximally open, when the predicted exhaust gas temperature is in the setpoint exhaust gas temperature range or thereabove, as illustrated by the dashed line in FIG. 3. Alternatively, as illustrated by the solid line in FIG. 3, maximum manipulated variable ξ_AK_max of exhaust gas flap 15 may be set to a value between maximum operating manipulated variable ξ_AK_1 and minimum operating manipulated variable ξ_AK_0 when the predicted exhaust gas temperature is in the setpoint exhaust gas temperature range or thereabove. The value continuously decreases in the direction of the minimum operating manipulated variable with an increasing difference between predicted exhaust gas temperature T_15_pred and setpoint minimum exhaust gas temperature T_15_min.

Manipulated variable ξ_WG of bypass valve 13 is set via a first actuator, and manipulated variable ξ_AK of exhaust gas flap 15 is set via a second actuator, in a further method step V60.

The method according to the present disclosure is implemented on control unit 21.

Figure 4:
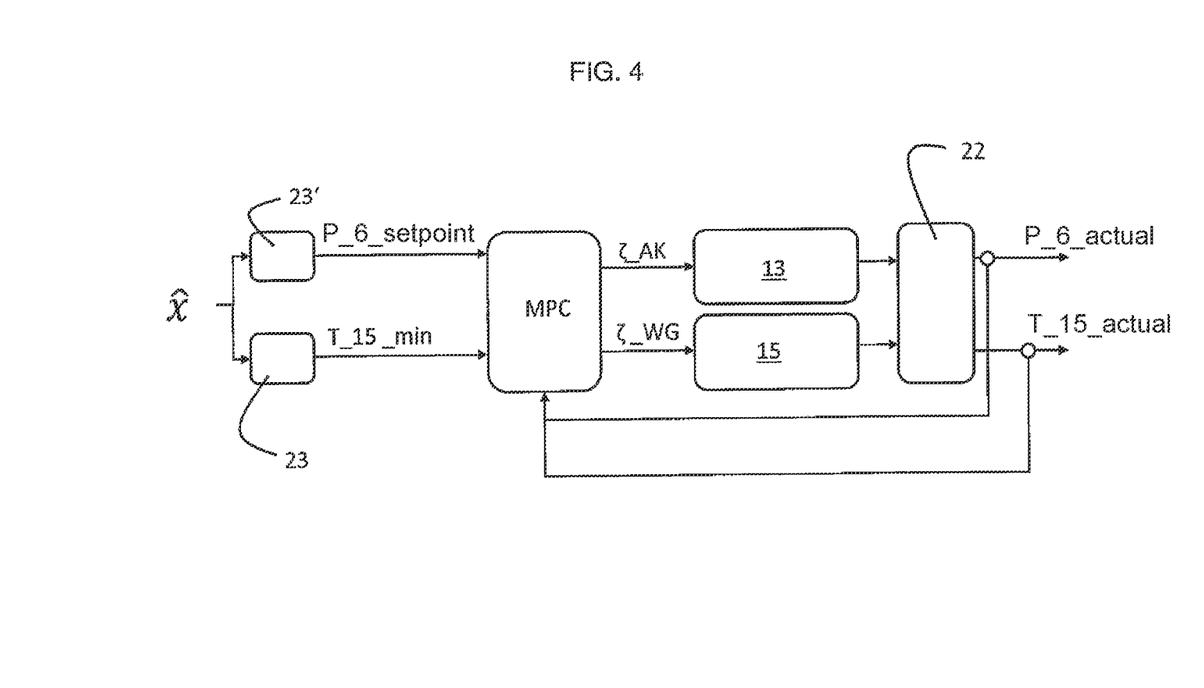
FIG. 4 shows a graphical illustration of a control loop that is implemented in the internal combustion engine according to FIG. 1.

The method is described in a simplified form in FIG. 4 with reference to a control loop. Setpoint minimum exhaust gas temperature T_15_min is determined from state vector x̂ of internal combustion engine 1, based on above-described ascertainment 23 of the setpoint exhaust gas temperature range, and is transferred to model-predictive controller MPC. In addition, setpoint charge pressure P_6_setpoint is determined from state vector x̂ of internal combustion engine 1, based on above-described ascertainment 23' of setpoint charge pressure P_6_setpoint, and is transferred to the model-predictive controller.

Actual charge pressure P_6_actual and actual exhaust gas temperature T_15_actual are ascertained and transferred to model-predictive controller MPC. Model-predictive controller MPC simultaneously determines manipulated variable ξ_WG of bypass valve 13 and manipulated variable ξ_AK of exhaust gas flap 15 as a function of actual charge pressure P_6_actual, of actual exhaust gas temperature T_15_actual, of setpoint charge pressure P_6_setpoint, and the setpoint exhaust gas temperature range having setpoint minimum exhaust gas temperature T_15_min.

Via controlled system 22, new values for charge pressure P_6 and exhaust gas temperature T_15 once again result for a subsequent point in time.

LIST OF REFERENCE NUMERALS 1 internal combustion engine
2 crankcase
3 combustion chambers
4 intake duct
5 intake manifold
6 measuring point
7 charge air cooler
8 exhaust duct
9 exhaust manifold
10 measuring point
11 turbine duct
12 bypass duct
13 bypass valve
14 collection point
15 exhaust gas flap
16 exhaust aftertreatment system
17 exhaust gas turbocharger
18 compressor
19 turbine
20 shaft
21 control unit
22 controlled system
23 ascertainment
23 [sic] ascertainment
24 particulate filter
25 SCR metering system
26 SCR catalytic converter
T_temperature
P_pressure
x̂ state vector of the internal combustion engine

What is claimed is:

1. A method for simultaneously regulating the exhaust gas temperature and the charge pressure of an internal combustion engine, the method comprising:
    ascertaining an actual charge pressure;
    ascertaining an actual exhaust gas temperature;
    determining a setpoint charge pressure;
    determining a setpoint exhaust gas temperature range;
    simultaneously determining a manipulated variable of a bypass valve, via which at least a portion of an exhaust gas mass flow of the internal combustion engine may be led past a turbine of an exhaust gas turbocharger, and a manipulated variable of an exhaust gas flap with the aid of a nonlinear model-predictive controller as a function of the actual charge pressure, the actual exhaust gas temperature, the setpoint charge pressure, and the setpoint exhaust gas temperature range; and
    setting the manipulated variable of the bypass valve and the manipulated variable of the exhaust gas flap.

2. The method as recited in claim 1, wherein the nonlinear model-predictive controller predicts a charge pressure at a subsequent point in time as a function of the manipulated variable of the bypass valve and of the manipulated variable of the exhaust gas flap,
    the nonlinear model-predictive controller predicts an exhaust gas temperature at a subsequent point in time as a function of the manipulated variable of the bypass valve and of the manipulated variable of the exhaust gas flap,
    the nonlinear model-predictive controller minimizes a quality function,
    the quality function representing a function based on the difference between the setpoint charge pressure and the predicted charge pressure at the subsequent point in time and based on the difference between the setpoint exhaust gas temperature range and the predicted exhaust gas temperature at the subsequent point in time.

3. The method as recited in claim 2, wherein the nonlinear model-predictive controller minimizes the quality function, taking at least one constraint into account, the at least one constraint being a function of one of the following:
    the maximum rotational speed of an exhaust gas turbocharger of the internal combustion engine,
    the maximum exhaust gas pressure of the internal combustion engine,
    the maximum exhaust gas temperature in the exhaust duct of the internal combustion engine,
    the maximum exhaust gas temperature at the turbine of the exhaust gas turbocharger of the internal combustion engine,
    the minimum fuel-air ratio in the combustion chamber of the internal combustion engine, and
    the maximum manipulated variable of the exhaust gas flap.

4. The method as recited in claim 3, wherein the maximum manipulated variable of the exhaust gas flap is determined as a function of the predicted exhaust gas temperature,     when the predicted exhaust gas temperature is below the setpoint exhaust gas temperature range, the maximum manipulated variable of the exhaust gas flap being set to a maximum operating manipulated variable for which the exhaust gas flap is maximally closed, and     when the predicted exhaust gas temperature is in the setpoint exhaust gas temperature range or thereabove, the maximum manipulated variable of the exhaust gas flap being set or continuously decreased to a minimum operating manipulated variable for which the exhaust gas flap is maximally open.

5. The method as recited in one of claim 1, wherein the setpoint exhaust gas temperature range is determined by determining a setpoint minimum exhaust gas temperature of the setpoint exhaust gas temperature range.

\* \* \* \* \*